No. 620,917. Patented Mar. 14, 1899.
W. H. HAMMOND.
APPARATUS FOR TESTING DRAINS, &c.
(Application filed Oct. 22, 1898.)
(No Model.)

Witnesses
J. Fred Powell
Richard N. Woolford

Inventor
William Henry Hammond

UNITED STATES PATENT OFFICE.

WILLIAM HENRY HAMMOND, OF WAKEFIELD, ENGLAND.

APPARATUS FOR TESTING DRAINS, &c.

SPECIFICATION forming part of Letters Patent No. 620,917, dated March 14, 1899.

Application filed October 22, 1898. Serial No. 694,275. (No model.)

*To all whom it may concern:*

Be it known that I, WILLIAM HENRY HAMMOND, a subject of the Queen of Great Britain, residing at Wakefield, in the county of York, England, have invented certain new and useful Improvements in Apparatus for Testing Drains and the Like, of which the following is a specification.

The object of my invention is to provide a means of and an apparatus for testing drains and the like.

Figure 1:
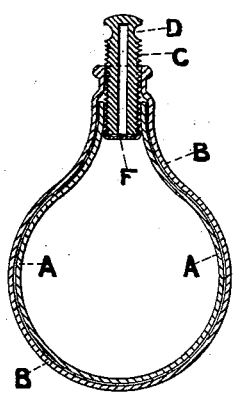
Figure 2:
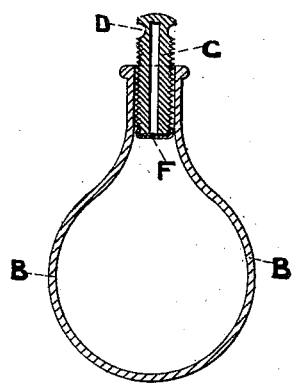
Figure 3:
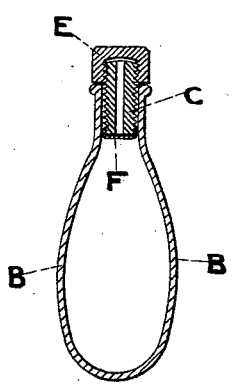
Figure 4:
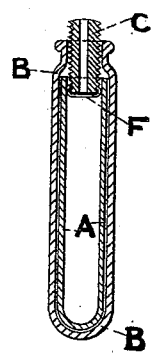

In the drawings, Figure 1 shows my improved drain-tester. Figs. 2, 3, and 4 show modifications of same.

I employ a tube or bulb A, (see Figs. 1 and 4,) of glass, earthenware, or other brittle material, which I incase in a bag or cover B, of rubber or the like substance. The tube or bulb is charged with any suitable strong-smelling chemical and is provided with a screwed nipple C, which is connected with an ordinary air-pump when the tester is to be used. The said nipple C is wired or otherwise secured within the mouth of the bag B and is preferably made in soft metal with one end closed, (see Figs. 1 and 2,) so that the tester is sealed until required for use, a groove D being left to facilitate cutting off the end when the pump is to be connected, or the tester may be sealed by means of a detachable cap E. (See Fig. 3.) The inner end of the nipple may also be closed by a thin rubber cap F, which is blown off by the pump.

If desired, I may dispense with the inner tube or bulb A and employ only (see Figs. 2 and 3) the bag or capsule B, which may be of rubber, gutta-percha, gelatin, or the like substances and of any suitable shape.

To test the drain, the inner tube or bulb A (if such be employed) is broken and the charged tester, after being connected to the air-pump with a suitable length of tubing, is inserted into the water-closet, trap, gulley-trap, or other suitable opening in the drain and is flushed with water to insure it passing the trap. The bag, cover, or capsule B is then burst by pressure from the air-pump, the chemicals being liberated within the drain and giving an effectual test. The gases or smoke arising from the chemicals may be driven throughout the course of the drain by operating the pump for a short time after the tester is exploded, the report of which may be plainly heard by the operator.

The tester is absolutely water and weather proof until exploded by the pump.

What is claimed as the invention, and is desired to be secured by Letters Patent, is—

1. In a device for testing drains, the combination, with a capsule formed of elastic material and retaining an odorous chemical, of a nipple for the attachment of an air-pump projecting from the said capsule, and a thin collapsible cap secured over the inner end of the nipple inside the capsule and closing the nipple after the air-pump is attached to it, the said cap and capsule being arranged to be burst in succession by the air-pump, substantially as set forth.

2. In a device for testing drains, the combination, with an inner vessel of frangible material for holding an odorous chemical, and an outer capsule formed of elastic material; of a nipple for the attachment of an air-pump projecting from the said vessel and capsule, and a thin cap closing the nipple after the air-pump is attached to it, the said cap and capsule being arranged to be burst in succession by the air-pump, substantially as set forth.

In testimony whereof I hereunto affix my signature in the presence of two witnesses.

WILLIAM HENRY HAMMOND.

Witnesses:
    T. FRED POWELL,
    RICHARD H. WOOLFORD.